(12) United States Patent
Woodward et al.

(10) Patent No.: US 7,308,423 B1
(45) Date of Patent: Dec. 11, 2007

(54) TECHNIQUE FOR HANDLING SALES OF REGULATED ITEMS IMPLEMENTED OVER A DATA NETWORK

(76) Inventors: Franklin Goodhue Woodward, 10 La Fond La., Orinda, CA (US) 94563; James Connell Mills, 475 29th St., San Francisco, CA (US) 94131; Randolph Ashton Hodge, 181 Ada Ave., #15, Mountain View, CA (US) 94043; Andrew Karl Miller, 596 Panchita Way, Los Altos, CA (US) 94022; Joyo Wijaya, 125 Seminary Dr., Menlo Park, CA (US) 94025

( * ) Notice: Subject to any disclaimer, the term of this patent is extended or adjusted under 35 U.S.C. 154(b) by 396 days.

(21) Appl. No.: 09/813,235

(22) Filed: Mar. 19, 2001

(51) Int. Cl.
G06Q 30/00 (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 2,781,643 | A | 2/1957 | Fairweather |
| 3,406,532 | A | 10/1968 | Rownd et al. |
| 3,670,867 | A | 6/1972 | Traube |
| 4,213,310 | A | 7/1980 | Buss |
| 4,455,453 | A | 6/1984 | Parasekvakos et al. |
| 4,656,591 | A | 4/1987 | Goldberg |
| 4,799,156 | A | 1/1989 | Shavit et al. |
| 4,887,208 | A | 12/1989 | Schneider et al. |
| 4,936,738 | A | 6/1990 | Brennan |
| 5,038,283 | A | 8/1991 | Caveney |
| 5,093,794 | A | 3/1992 | Howie et al. |
| 5,105,627 | A | 4/1992 | Kurita |
| 5,122,959 | A | 6/1992 | Nathanson et al. |
| 5,235,819 | A | 8/1993 | Bruce |

(Continued)

FOREIGN PATENT DOCUMENTS

FR 2696722 4/1994

(Continued)

OTHER PUBLICATIONS

Van Den Berg, Jeroen, P, "A Literature Survey on Planning and Control of Warehousing Systems", IIE Trasnactions vol. 31, No. 3, p. 751, Aug. 1999.

(Continued)

*Primary Examiner*—F. Zeender
*Assistant Examiner*—M. Thein

(57) ABSTRACT

A technique is disclosed for implementing electronic commerce transactions via a data network. A regulated item selected by a customer is identified. The regulated item may correspond to an item which satisfies predetermined criteria, indicating that the regulated item is prohibited from being purchased by the customer. Action is then taken to prohibit the purchase of the selected item, via the data network, by the customer. According to one embodiment, the action taken to prohibit the purchase of the regulated item is automatically implemented at a server system configured to implement electronic commerce transactions between an on-line merchant and the customer. According to a specific implementation, the predetermined criteria correspond to regulations which restrict sales of the regulated items to persons in a particular jurisdiction based upon certain criteria such as, for example, time of day, day of week, age of the customer, type of product being sold, etc.

39 Claims, 8 Drawing Sheets

U.S. PATENT DOCUMENTS

| | | | |
|---|---|---|---|
| 5,237,158 A | 8/1993 | Kern et al. | |
| 5,246,332 A | 9/1993 | Bernard | |
| 5,265,006 A | 11/1993 | Asthana | |
| 5,272,638 A | 12/1993 | Martin et al. | |
| 5,273,392 A | 12/1993 | Bernard | |
| 5,322,406 A | 6/1994 | Pippin et al. | |
| 5,363,310 A | 11/1994 | Haj-Ali-Ahmadi et al. | |
| 5,395,206 A | 3/1995 | Cerny, Jr. | |
| 5,428,546 A | 6/1995 | Shah et al. | |
| 5,533,361 A | 7/1996 | Halpern | |
| 5,548,518 A | 8/1996 | Dietrich et al. | |
| 5,593,269 A | 1/1997 | Bernard | |
| 5,615,121 A | 3/1997 | Babayev et al. | |
| 5,666,493 A | 9/1997 | Wojcik et al. | |
| 5,694,551 A | 12/1997 | Doyle et al. | |
| 5,712,989 A | 1/1998 | Johnson et al. | |
| 5,758,313 A | 5/1998 | Shah et al. | |
| 5,758,328 A | 5/1998 | Giovannoli | |
| 5,761,673 A | 6/1998 | Bookman et al. | |
| 5,768,139 A | 6/1998 | Pippin et al. | |
| H1743 H | 8/1998 | Graves et al. | |
| 5,809,479 A | 9/1998 | Martin et al. | |
| 5,826,242 A | 10/1998 | Montulli | |
| 5,826,825 A | 10/1998 | Gabriel | |
| 5,831,860 A | 11/1998 | Foladare et al. | |
| 5,832,457 A | 11/1998 | Cherney | |
| 5,834,753 A | 11/1998 | Danielson et al. | |
| 5,835,914 A | 11/1998 | Brim | |
| 5,839,117 A | 11/1998 | Cameron et al. | |
| 5,848,395 A | 12/1998 | Edgar et al. | |
| 5,878,401 A | 3/1999 | Joseph | |
| 5,880,443 A | 3/1999 | McDonald et al. | |
| 5,893,076 A | 4/1999 | Hafner et al. | |
| 5,894,554 A | 4/1999 | Lowery et al. | |
| 5,897,622 A | 4/1999 | Blinn et al. | |
| 5,897,629 A | 4/1999 | Shinagawa et al. | |
| 5,899,088 A | 5/1999 | Purdum | |
| 5,910,896 A | 6/1999 | Hahn-Carlson | |
| 5,918,213 A | 6/1999 | Bernard et al. | |
| 5,943,652 A | 8/1999 | Sisley et al. | |
| 5,943,841 A | 8/1999 | Wunscher | |
| 5,956,709 A | 9/1999 | Xue | |
| 5,963,919 A | 10/1999 | Brinkley et al. | |
| 5,979,757 A * | 11/1999 | Tracy et al. | 235/383 |
| 6,023,683 A | 2/2000 | Johnson et al. | |
| 6,061,607 A | 5/2000 | Bradley et al. | |
| 6,070,147 A * | 5/2000 | Harms et al. | 705/14 |
| 6,073,108 A | 6/2000 | Peterson | |
| 6,081,789 A | 6/2000 | Purcell | |
| 6,083,279 A | 7/2000 | Cuomo et al. | |
| 6,085,170 A | 7/2000 | Tsukuda | |
| 6,101,481 A | 8/2000 | Miller | |
| 6,140,922 A | 10/2000 | Kakou | |
| 6,178,510 B1 * | 1/2001 | O'Connor et al. | 726/5 |
| 6,185,625 B1 | 2/2001 | Tso et al. | |
| 6,215,952 B1 * | 4/2001 | Yoshio et al. | 386/94 |
| 6,233,543 B1 | 5/2001 | Butts et al. | |
| 6,249,801 B1 | 6/2001 | Zisapel et al. | |
| 6,260,024 B1 | 7/2001 | Shkedy | |
| 6,275,812 B1 | 8/2001 | Haq et al. | |
| 6,289,260 B1 | 9/2001 | Bradley et al. | |
| 6,292,784 B1 | 9/2001 | Martin et al. | |
| 6,324,520 B1 | 11/2001 | Walker et al. | |
| 6,332,334 B1 | 12/2001 | Faryabi | |
| 6,341,269 B1 | 1/2002 | Dulaney et al. | |
| 6,343,275 B1 | 1/2002 | Wong | |
| 6,397,246 B1 | 5/2002 | Wolfe | |
| 6,405,173 B1 | 6/2002 | Honarvar et al. | |
| 6,424,947 B1 * | 7/2002 | Tsuria et al. | 705/1 |
| 6,445,976 B1 | 9/2002 | Ostro | |
| 6,453,306 B1 | 9/2002 | Quelene | |
| 6,463,345 B1 | 10/2002 | Peachey-Kountz et al. | |
| 6,463,420 B1 | 10/2002 | Guidice et al. | |
| 6,490,567 B1 | 12/2002 | Gregory | |
| 6,496,205 B1 | 12/2002 | White et al. | |
| 6,505,093 B1 | 1/2003 | Thatcher et al. | |
| 6,505,171 B1 * | 1/2003 | Cohen et al. | 705/26 |
| 6,526,392 B1 | 2/2003 | Dietrich et al. | |
| 6,530,518 B1 | 3/2003 | Krichilsky et al. | |
| 6,567,786 B1 | 5/2003 | Bibelnieks et al. | |
| 6,571,213 B1 | 5/2003 | Altendahl et al. | |
| 6,578,005 B1 | 6/2003 | Lesaint et al. | |
| 6,598,027 B1 * | 7/2003 | Breen et al. | 705/26 |
| 6,622,127 B1 | 9/2003 | Klots et al. | |
| 6,654,726 B1 | 11/2003 | Hanzek | |
| 6,697,964 B1 | 2/2004 | Dodrill et al. | |
| 6,741,995 B1 | 5/2004 | Chen et al. | |
| 6,748,418 B1 | 6/2004 | Yoshida et al. | |
| 6,763,496 B1 | 7/2004 | Hennings et al. | |
| 6,862,572 B1 | 3/2005 | de Sylva | |
| 6,970,837 B1 | 11/2005 | Walker et al. | |
| 6,990,460 B2 | 1/2006 | Parkinson | |
| 2001/0037229 A1 | 11/2001 | Jacobs et al. | |
| 2001/0042021 A1 * | 11/2001 | Matsuo et al. | 705/26 |
| 2001/0047285 A1 | 11/2001 | Borders et al. | |
| 2001/0047310 A1 * | 11/2001 | Russell | 705/26 |
| 2001/0049619 A1 | 12/2001 | Powell et al. | |
| 2001/0049672 A1 | 12/2001 | Moore | |
| 2002/0004766 A1 * | 1/2002 | White | 705/27 |
| 2002/0007299 A1 | 1/2002 | Florence | |
| 2002/0013950 A1 * | 1/2002 | Tomsen | 725/109 |
| 2002/0038224 A1 | 3/2002 | Bhadra | |
| 2002/0049853 A1 | 4/2002 | Chu et al. | |
| 2002/0065700 A1 | 5/2002 | Powell et al. | |
| 2002/0188530 A1 | 12/2002 | Wojcik et al. | |
| 2002/0194087 A1 | 12/2002 | Spiegel et al. | |
| 2003/0045340 A1 * | 3/2003 | Roberts | 463/17 |
| 2003/0079227 A1 * | 4/2003 | Knowles et al. | 725/50 |
| 2003/0233190 A1 | 12/2003 | Jones | |
| 2004/0236635 A1 | 11/2004 | Publicover | |
| 2005/0027580 A1 | 2/2005 | Crici et al. | |
| 2005/0144641 A1 * | 6/2005 | Lewis | 725/60 |

FOREIGN PATENT DOCUMENTS

| | | |
|---|---|---|
| GB | 2 265 032 A | 9/1993 |
| WO | WO99/07121 | 2/1999 |

OTHER PUBLICATIONS

Vass et al., "The World Wide Web—Everything you (n)ever wanted to know about its server", IEEE, Oct./Nov. 1998, pp. 33-37.

Wilson, Joe, "Selecting Warehouse Management Software (WMS) for Food Distribution Operations", Frozen Food Digest, Oct. 1998, vol. 14, No. 1, p. 18.

Wunnava et al., "Interactive Multimedia on the World Wide Web", IEEE, Aug. 1999, pp. 110-115.

Norton, Tim R., "End-To-End Response-Time: Where to Measure?", Computer Measurement Group Conference Proceedings, CMG99 Session 423, Dec. 1999, pp. 1-9.

Hyten, Todd, "Stop & Shop mulls online grocery store", Boston Business Journal (Boston, MA, US), vol. 16, No. 6, p. 1, Mar. 22, 1996.

Pearce, Michael R. "From carts to clicks", Ivey Business Quartley, vol. 63, No. 1, pp. 69-71, Autumn 1998.

Worth Wren Jr., Fort Worth Star-Telegram Texas, "Albertson's Expects Online Grocery Shopping To Boom", KRTBN Knight-Ridder Tribune Business News (Fort Worth Star-Telegram, Texas), Nov. 9, 1998.

"Peapod Interactive Grocery Shopping and Delivery Service Now Delivers Via the Internet", Press Release, www.peapod.com, Apr. 22, 1996, pp. 1-2.

www.peapod.com, including Introduction to Peapod; How Peapod Works; Peapod; Choosing a Delivery Time; Peaod: Sending Your Order; Retrieved from Internet Archive (web.archive.org) on Jul. 23, 2006, alleged date Nov. 13, 1996, pp. 1-9.
U.S. Appl. No. 09/568,570, filed May 10, 2000.
U.S. Appl. No. 09/568,571, filed May 10, 2000.
U.S. Appl. No. 09/568,572, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 09/620,199, filed Jul. 20, 2000.
U.S. Appl. No. 09/750,385, filed Dec. 27, 2000.
U.S. Appl. No. 09/792,400, filed Feb. 22, 2001.
"Estimation of Consumer Demand with Stock-Out Based Substitution: An Application to Vending Machine Product", Anupindi, Ravi; Dada, Maqbool; Gupta, Sachin; Marketing Science; vol. 17, No. 4, 1998, pp. 406-423.
"Management of Multi-Item Retail Inventory Systems with Demand Substitution"; Smith, Stephen, Agrawal, Narendra; Operations Research; vol. 48, No. 1, Jan.-Feb. , pp. 50-64.
Automatic ID News,"20/20 Results Achieved with Technology Trio", Sep. 1995, p. 19.

Henry Towie, "On the Fast Track with Totaltracks: UPS Deploys Mobile Data Service," Abstract No., XP-000560076, Document Delivery World, vol. 9, No. 3, 1993, pp. 30-31.
Hiroo Kawata, "Information Technology of Commercial Vehicles in the Japanese Parcel Service Business," Abstract No., XP-000560489, 1992, pp. 371-382.
Koster, Rene de, "Routing Orderpickers in a Warehouse: A Comparison Between Optimal and Heuristic Solutions," IIE Transactions, vol. 30, No. 5, p. 469, May 1998.
Maloney, David, "The New Corner Drugstore", May 1, 2000, Modern Materials Handling, vol. 55, No. 5, p. 58.
PC Foods, "Customer Sevice Agreement," printed from website: http://www.pcfoods.com, Abstract No., XP-002245026, 1999, pp. 1-2.
Takashi Sekita, "The Physical Distribution Information Network in the Home-Delivery Business," Japan Computer Quarterly, Abstract No., XP-00.431194, 1990, pp. 23-32.
The Impact of Electronic Data Interchange on Competetiveness in Retail Supply Chain, Brian Fynes et al., IBAR v14n2 pp. 16-2 1993.

* cited by examiner

| | DC Group | Zone | Sub Zone | Reg Code | Condition ID | Restriction ID | Age | Addr | Day | Time | Eff Date | Exp Date |
|---|---|---|---|---|---|---|---|---|---|---|---|---|
| 401→ | All | | | A | Min Age | No checkout | 21 | | | | 3/15/00 | |
| | All | | | A | Min Age | No leave | 21 | | | | 3/15/00 | |
| 403→ | All | | | T | Min Age | No checkout | 18 | | | | 3/15/00 | |
| | All | | | T | Min Age | No leave | 18 | | | | 3/15/00 | |
| | All | | | A | Hours | No delivery | | | | 12:01am-6am | 3/15/00 | |
| | All | | | A | Minimum Price | Min price retail | | | | | 3/15/00 | |
| 405→ | ATL01 | | All dry subzones | A | Min Age | No checkout | 18 | | | | 3/15/00 | |
| | ATL01 | | | A | Dry del address | No delivery | | | | | 3/15/00 | |
| | ATL01 | | Gwinet subzones | A | Day of week delivery | No delivery | | | Sunday | | 3/15/00 | |
| | ATL01 | | | A | Hours | No delivery | | | | 12:01am-7am | 3/15/00 | |
| 407→ | ATL01 | | | AD | No sales allowed | No item page | | | | | 3/15/00 | |
| 409→ | ATL01 | | | AD | No sales allowed | No item catalog | | | | | 3/15/00 | |
| | BAY01 | | | DF | Minimum Price | Min price retail | | | | | 3/15/00 | |

| Condition ID | Description |
|---|---|
| Min Age | Under age |
| Dry del address | Delivery address is in a dry location |
| Day of week shopping | Specified day of week for shopping |
| Day of week delivery | Specified day of week for delivery |
| Hours | Specified hours of operation |
| Same state | Delivery and fulfilling address must be in same state |
| Minimum Price | Minimum price controls |

Fig. 7B
750

| Restriction ID | Description |
|---|---|
| No checkout | Do not checkout item |
| No delivery | Do not deliver to address |
| No leave | Do not leave item with recipient |
| No price | Do not display price |
| No item page | Do not display on item page |
| Min price retail | Do not price below retail |
| No item catalog | Do not include in a given DC item catalog |
| No Cart | Do not add to cart |

Fig. 7C
770

| Regulation Code | Description |
|---|---|
| A | Alcohol |
| AB | Beer |
| AB3 | 3.2% Beer |
| AD | Distilled spirits |
| AW | Wine |
| DF | Dairy - Fluid |
| I | Insignia |
| T | Tobacco |
| TCT | Cigarettes |
| TCG | Cigars |
| TPP | Pipe tobacco |
| NON | Not Regulated |

TECHNIQUE FOR HANDLING SALES OF REGULATED ITEMS IMPLEMENTED OVER A DATA NETWORK

CROSS-REFERENCE TO RELATED APPLICATIONS

This application is related to the following patent applications: U.S. patent application Ser. No. 09/568,603 naming Borders et al. as inventors, and U.S. patent application Ser. No. 09/750,385, naming Wijaya et al. as inventors. Each of the above-referenced US patent applications is incorporated herein by reference in its entirety for all purposes.

BACKGROUND OF THE INVENTION

1. Field of the Invention

The present invention relates generally to electronic commerce, and more specifically to a technique for handling on-line sales and delivery of regulated items implemented using a data network.

2. Background

Over the past decade there has been a dramatic increase in on-line electronic commerce transactions conducted between consumers and retailers via the Internet or World Wide Web. Typically, during an electronic commerce transaction, the on-line merchant or retailer displays an electronic catalog of items which are available for purchase by a consumer or customer. The consumer then selects desired items to add to his or her electronic shopping cart and, when finished, requests to proceed to "checkout" in order to purchase the selected items and complete the electronic commerce transaction. Once the "checkout" transaction has been completed, the on-line merchant then fulfills the customer order, and either ships or delivers the customer order to a delivery location specified by the customer.

It is noted that most electronic commerce transactions that occur over the Internet are subject to the regulatory laws of the state or region where each on-line sales transaction has occurred. Typically, the laws and regulations governing on-line sales transactions are determined based upon the customer's billing address or the location where the delivery is to take place.

It is the responsibility of the on-line merchant to be aware of and conform with the requirements of each state's regulations relating to electronic commerce transactions in that state. Unfortunately, many on-line merchants are not able to conform with each state's regulations governing on-line sales transactions when engaging in electronic commerce transactions with customers in a particular state. One reason for this is that many systems which are designed to implement electronic commerce transactions are not configured to take into account each of the regulations governing electronic commerce transactions when taking orders from customers residing in different states or regions.

Accordingly, there exists a continual need to improve upon electronic commerce techniques in order to comply with laws and regulations which affect electronic commerce and on-line sales transactions.

SUMMARY OF THE INVENTION

According to specific embodiments of the present invention, a method and computer program product are disclosed for implementing electronic commerce transactions via a data network. A regulated item selected by a customer is identified. The regulated item may correspond to an item which satisfies predetermined criteria, indicating that the regulated item is prohibited from being purchased by the customer. Action is then taken to prohibit the purchase of the selected item, via the data network, by the customer. According to one embodiment, the action taken to prohibit the purchase of the regulated item is automatically implemented at a server system configured to implement electronic commerce transactions between an on-line merchant and the customer. According to a specific implementation, the predetermined criteria correspond to regulations which restrict sales of the regulated items to persons in a particular jurisdiction based upon certain criteria such as, for example, time of day, day of week, age of the customer, type of product being sold, etc.

According to specific embodiments, a variety of techniques may be used to prevent the purchase of the regulated item by the customer. In one embodiment, the display of items available for purchase by the customer may be modified to restrict the display of items which are not allowed to be purchased by the customer based upon specific criteria. In another embodiment, the customer may be prevented from adding the regulated item to the customer's electronic shopping cart. Alternatively, the customer may be prevented from purchasing or checking out the regulated item during an on-line checkout procedure.

According to different embodiments of the present invention, a number of different parameters may be used for handling the on-line sale of regulated items to customers via a data network. For example, according to one implementation, each regulated item may have associated with it a specific regulation code parameter which may be used for identifying items which are associated with a specific class of regulated products. In another implementation, condition parameters may be used for identifying selected legal requirements which necessitate or mandate an invocation of at least one type of compliance action in order to comply with the selected legal requirements. In another embodiment, restriction parameters may be used for identifying at least one type of compliance action to be performed in order to comply with the legal regulations which restrict sales of regulated items to persons in particular jurisdictions.

Another embodiment of the present invention is directed to a system for implementing electronic commerce transactions via a data network. The system comprises at least one CPU, memory, and at least one interface configured to provide an interface with at least one customer via a data network. The system is configured to identify a regulated item selected by a customer, wherein the regulated item corresponds to an item which satisfies predetermined criteria. The predetermined criteria may indicate that the regulated item is prohibited from being purchased by the customer. The system is also configured to take action to prohibit the purchase of the selected item via the data network, by the customer.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 4 shows an example of a Regulation Table in accordance with a specific embodiment of the present invention.

FIGS. 7A–7C illustrate various types of rules, conditions, regulations, and/or other information which may be used for implementing the regulated item processing technique in accordance with a specific embodiment of the present invention.

DETAILED DESCRIPTION OF THE PREFERRED EMBODIMENTS

Figure 1:
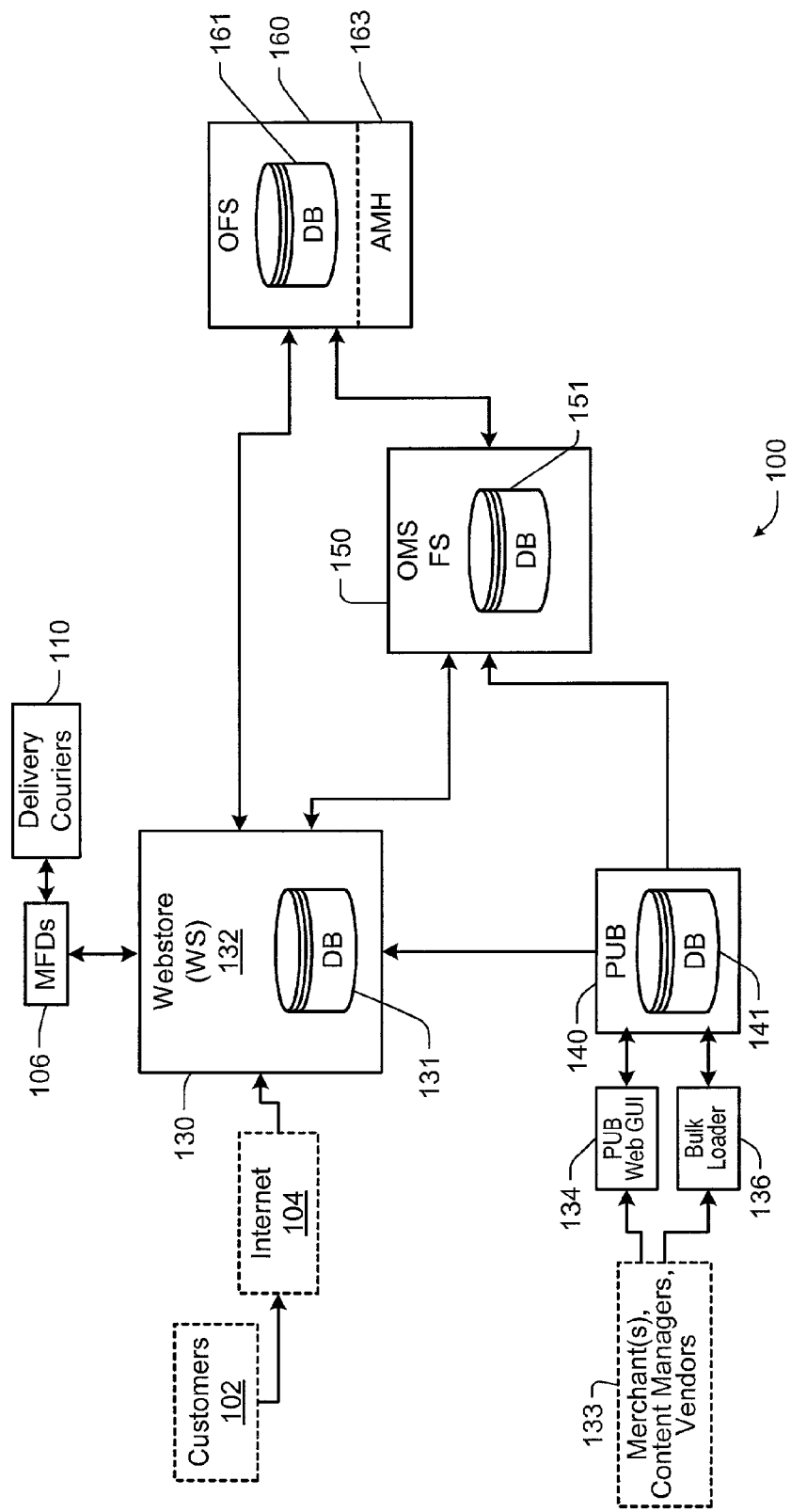
FIG. 1 shows a schematic block diagram showing the most relevant parts of integrated system architecture in accordance with a specific embodiment of the present invention.

According to specific embodiments of the present invention, a technique is described for handling on-line sales of regulated items or products during electronic commerce transactions. It will be appreciated that the handling of on-line sales of regulated items of merchandise provides a difficult challenge since there are literally thousands of federal, state, county, city, and township regulations which may need to be complied with across thousands of geographic jurisdictions. Additionally, many of these laws and regulations were not originally drafted to take into account electronic commerce transactions. As a result, an additional level of difficulty in applying such regulations to electronic commerce exists in that legal interpretations of such laws need to be preformed so as to correctly apply the appropriate laws and regulations to electronic commerce transactions.

Generally, the regulatory laws governing retail commerce transactions mandate specific restrictions concerning the pricing, display, sale, and/or delivery of regulated products. Many of these laws, however, are similar in nature, and therefor may be distilled down to a limited number of common conditions which require compliance activity. According to a specific embodiment of the present invention, the conditions and compliance activities are preferably treated in a systematic manner in order to allow the generation of a base set of rules which may then be re-applied, perhaps with different parameters, to different jurisdictions. According one implementation, the base set of rules may be represented as business rules which may be embodied by a set of lists or tables that enable an electronic commerce system to quickly, easily, and reliably identify regulated items of merchandise, and to easily respond to changing laws and/or regulations.

FIGS. 7A–7C illustrate various types of rules, conditions, regulations, and/or other information which may be used for implementing the regulated item processing technique in accordance with a specific embodiment of the present invention. As described in this application, the term "regulated SKU" or "regulated item" may be defined as a SKU (i.e., item of merchandise) which has associated with it special needs for the display, sale, delivery, pricing and/or vendor selection as mandated by law or other requirements.

According to a specific embodiment of the present invention, selected SKUs in the on-line catalog may be assigned a corresponding regulation code attribute which enables that SKU to be identified as belonging to a particular class of regulated products. In a specific implementation, the assignment of a regulation code attribute may be applied only to regulated SKUs of the on-line catalog. An example of a regulation code assignment scheme is shown in FIG. 7C of the drawings.

FIG. 7C shows a Regulation Code Attribute Table 770 in accordance with a specific embodiment of the present invention. The Regulation Code Attribute Table 770 may be used to help identify regulated SKUs which belong to a particular class or sub-class of regulated products. According to one implementation, the regulation code attributes may be structured so as to allow identification of different levels of granularity within a particular regulated product category. For example, as shown in FIG. 7C, the regulation code table 770 includes a regulation code entry 772 and an associated description 774 of the class or sub-class of the regulated products associated with that particular regulation code. Thus, for example, as shown in FIG. 7C, the regulation code "A" may be used to identify all SKUs which are related to alcohol type products. The regulation code "AB" may be used to identify all SKUs which are associated with beer products. In this example, the regulation code "AB" for beer products represents a sub-class of regulated alcohol products. The regulation code "AB3" may be used to identify SKUs which are associated with beer having a 3.2% alcohol content, which is a sub-class of the regulated beer products. Thus, for example, if a particular SKU has an associated regulation code attribute of AB3, this SKU may be interpreted as being an alcohol product, a beer product, and/or a 3.2% beer product. It will be appreciated that any or all of these interpretations may be used for applying the appropriate regulatory rules for handling on-line sales of this item.

As shown in FIG. 7C, the Regulation Code Attribute Table 770 may be used to define a plurality of different classes and sub-classes of regulated products such as, for example, alcohol, beer, 3.2% beer, distilled spirits, wine, dairy, insignia, tobacco, cigarettes, cigars, pipe tobacco, non-regulated products, etc. It will be appreciated that the regulated classes and sub-classes of products described in the table of FIG. 7C does not represent a complete list of all regulated products. Moreover, the regulation code attribute table may be modified to include additional classes and sub-classes of other regulated products, which will generally be known to one having ordinary skill in the art.

In addition to the regulation code attributes, a list or table of conditions may also be provided for use in identifying legal requirements which may mandate that the electronic commerce system evoke one or more types of compliance actions when selling particular regulated products to customers over a data network such as, for example, the Internet.

FIG. 7A shows an example of a conditions list or Conditions Table 700 in accordance with a specific embodiment of the present invention. According to one implementation, the conditions table may enumerate different types of regulatory conditions which may evoke compliance actions within any of the on-line merchant's service areas.

As shown in FIG. 7A, the Conditions Table 700 includes a plurality of entries relating to specific condition identifiers or condition IDs. Each entry represents a specific condition or legal requirement which may require the on-line merchant to evoke one or more compliance actions. Each entry in the Conditions Table 700 may include, for example, a Condition ID field 702 and a description field 704.

In the example of FIG. 7A, the Conditions Table 700 may be used to define a plurality of different regulatory conditions such as, for example, minimum age conditions, dry delivery address conditions, day of week shopping conditions, day of week delivery conditions, hours of operation conditions, period of day shopping conditions, period of day delivery conditions, same state delivery conditions, minimum price conditions, etc.

For example, the condition "MIN AGE" may be used to represent legal regulations or mandates which exist related to shoppers, customers, or delivery recipients whose age is less than a specified minimum. The Condition ID entry corresponding to "DAY OF WEEK SHOPPING" may be used to refer to regulations or mandates which exist relating to the sale and/or delivery of items which are restricted during certain days of the week. For example, certain states have mandated that alcohol is not to be sold to customers on Sunday or Election Day. It will be appreciated that the Conditions Table 700 represents a portion of the various conditions regulating electronic commerce transactions, and that the table may be modified to include additional conditions which will generally be known to one having ordinary skill in the art.

The Conditions Table 700 of FIG. 7A does not specify what actions are to be implemented in enforcing a particular condition. Thus, according to one implementation, the conditions list may be used as way to categorize and list each possible type of regulatory condition that may affect electronic commerce transactions conducted by the on-line merchant.

According to a specific embodiment, selected conditions in the conditions list may evoke one or more compliance actions or restrictions by the on-line merchant. Further, according to a specific implementation, at least one list or table may be generated which includes various types of compliance actions which may be automatically evoked by the on-line merchant's computer system in order to restrict the sale of specific regulated products.

FIG. 7B shows an example of a regulation list or table 750 in accordance with a specific embodiment of the present invention. As shown in FIG. 7B, the restrictions table 750 includes a plurality of entries which specify various types of compliance actions which may be automatically implemented by the on-line merchant's electronic commerce system to enforce or ensure compliance with specific regulatory conditions. According to one embodiment, the same restriction may be applied to more than one condition.

As shown in the example of FIG. 7B, each entry in the Restriction Table 750 includes a Restriction ID field 752 and a description field 754. Each restriction entry corresponds to a specific compliance action which may be used by the on-line merchant to enforce one or more regulatory conditions. For example, the restriction "no cart" may be used to indicate that a condition will be enforced by not allowing a customer to add a SKU item to the customer's electronic shopping cart. The restriction "no checkout" may be used to indicate that a condition may be enforced by not allowing the customer to purchase the SKU item.

According to a specific implementation, after the various regulation codes, condition IDs and restriction IDs parameters have been defined, these parameters may then be collated into a regulation list or table in order to generate a set of rules that may used to manage all or selected variations of regulatory compliance affecting electronic commerce transactions conducted by the on-line merchant in various jurisdictions. An example of a regulation table is shown in FIG. 4 of the drawings.

FIG. 4 shows an example of a Regulation Table 400 in accordance with a specific embodiment of the present invention. As described in greater detail below, the regulation table may be used to map various SKU regulation codes, conditions, restrictions, and parameterized values in order to allow an on-line merchant to implement the appropriate regulatory compliance action(s) when selling or delivering a regulated SKU product to a customer in specific jurisdictions. Entries in the regulation table may be made that set defaults for all distribution centers. However, individual distribution centers may be able to override the default entries with different or more stringent controls for specific delivery zones or sub-zones. According to one embodiment, the regulation table may be consulted to determine whether additional processing may be necessary whenever a regulated SKU is encountered at appropriate points in the customer order processing cycle.

According to a specific implementation, different regulation tables may be generated for handling sales or delivery of regulated products in specific regions or zones. Alternatively, a master regulation list may be generated for handling sales or deliveries or regulated products throughout all jurisdictions in which the merchant is engaging in electronic commerce transactions. Using the master regulation table, a single set of rules may be used to manage all variations of regulatory compliance in all jurisdictions of activity. Moreover, for any regulated SKU which is identified in a particular jurisdiction, the system of the present invention may reference the master restriction table in order to identify the appropriate rules(s) which apply when engaging in electronic commerce transaction activities relating to the regulated SKU.

For example, as shown in FIG. 4 of the drawings, the Regulation Table 400 includes a plurality of regulation entries (e.g., 401, 403, etc.), wherein each regulation entry includes a specific set of parameters which defines specific compliance actions which are to be automatically implemented if certain conditions or other parameters have been satisfied with respect to a particular class or sub-class of regulated product. The different parameters of the regulation table may include, for example, compliance actions based upon one or more of the following parameters: distribution center 402, delivery zone 404 or sub-zone 406, regulation code 408, Condition ID 410, Restriction ID 412, age of the customer 414, delivery address 416, day of the week 418, time of day 420, month of year, week of month, day of month, calendar date, effective data 422, expiration date 424, etc. Thus, for example, entry 401 of Regulation Table 400 relates to a compliance action which may be applied at all distribution centers in which alcohol products (e.g. SKUs associated with regulation code A) may not be sold (i.e. "No Checkout") to customers who do not meet the minimum age requirement of being at least 21 years of age. Entry 403 of the Regulation Table 400 relates to a compliance action which may be applied to all distribution centers in which tobacco products (e.g. SKUs associated with regulation code T) may not be sold (i.e. "No Checkout") to customers who do not meet the minimum age requirement of being at least 18 years of age.

It will be appreciated that the technique of the present invention may also accommodate jurisdictions having more or less stringent requirements relating to at least a portion of regulated products. For example, the city of Atlanta, Ga. prohibits the sale of alcohol on Sundays and Election Day, and also prohibits the sale of distilled spirits (e.g., alcohol products containing more than 21% alcohol by volume) by general merchants or grocery stores. The city of Atlanta also allows alcohol to be sold to persons who are at least 18 years of age. In order to comply with these legal requirements, specific entries may be included in the Regulation Table 400 of FIG. 4.

For example, entry 405 relates to a compliance action which may be implemented only at Atlanta distribution centers (ATL01), wherein alcohol products may not be sold to customers who are not at least 18 years of age. Entries 407 and 409 of the Regulation Table 400 relate to compliance actions wherein distilled spirits (e.g. SKUs associated with the regulation code AD) products are not displayed as being for sale to on-line customers whose residence address or delivery address is located in Atlanta.

Additionally, one or more entries in the Regulation Table 400 may include an effective date field 422 to allow a particular regulation entry to be entered into the table before the new regulation actually goes into effect. Further, selected regulation entries may include an expiration date field 424 which may be used for specifying a particular date and/or time when the corresponding legal regulation will no longer be in effect.

In the example of FIG. 4, two or more conditions and/or restrictions on separate line entries for the same regulation code may be interpreted as having an OR relationship. Two or more conditions and/or restrictions on the same line entry for a given SKU regulation code may be interpreted as having an AND relationship. For example, entry 401 of Regulation Table 400 relates to a compliance action which may be applied at all distribution centers in which alcohol products may not be sold to customers who do not meet the minimum age requirement of being at least 21 years of age, and where the regulation becomes effective on Mar. 15, 2000.

It will be appreciated that the Regulation Table 400 of FIG. 4 illustrates a specific embodiment for handling on-line sales of regulated products. However, it will be appreciated that the technique described herein for handling on-line sales of regulated products in different jurisdictions may be implemented using a variety of different implementation techniques. For example, according to a different embodiment, a specific set of rules and/or parameters may be used to define compliance actions in specific jurisdictions. For example, in order to prevent Sunday delivery of alcohol products for all delivery zones in the Atlanta region, the following set of rules and/or parameters may be applied:

Atlanta delivery zones=ALL
Month of Year=ALL
Week of Month=ALL
Day of Week=Sunday
Period of Day=ALL In order to prevent sale or delivery of alcohol to Atlanta residence on Election Day (i.e., the first Tuesday in November), the following rules and/or parameters may be defined:

Atlanta delivery zones=ALL
Month of Year=November
Week of Month=1
Day of Week=Tuesday
Period of Day=ALL FIG. 1 shows a schematic block diagram of a specific embodiment of an integrated system architecture 100 which may be used for implementing the regulated item processing technique of the present invention. As shown in FIG. 1, system 100 includes a plurality of subsystems and other components for effecting electronic commerce over a data network. A brief description of at least a portion of the plurality of subsystems of system 100 is presented below.

For example, system 100 of FIG. 1 may include a Publishing (PUB) Subsystem 140 which provides an interface to merchants, vendors and/or content managers 133; a Webstore Subsystem (WS) 132 which manages the on-line store interface with customers, including customer shopping and ordering transactions; an Order Management Subsystem (OMS) 150 which manages pricing data, item availability data, inventory data, vendor data, finance, procurement, etc.; an Order Fulfillment Subsystem (OFS) 160 which facilitates the fulfillment of customer orders; etc. Each of the various subsystems shown in FIG. 1 of the drawings will now be described briefly below.

According to a specific implementation, the PUB Subsystem 140 may be used for managing SKU inventory and catalog information (e.g. SKUs, UPCs, products, categories, descriptive attributes, etc.). Additionally, according to a specific implementation, the PUB subsystem may be used for allowing merchants or vendors to enter regulatory information such as, for example, regulation code parameters for selected SKUs, condition information, restriction information, etc.

"Inventory" is the stock of SKU items actually available for customer orders. Each different item of inventory is associated with a respective stock keeping unit or SKU, regardless of whether the item is available for customer purchase. A "stock keeping unit" or SKU may be defined as a unique identifier that corresponds to a particular consumer item. A type of product, for example, Brand A ketchup, may have several unique SKUs, each corresponding, for example, to different sizes and/or flavors of Brand A ketchup.

Merchants and content managers 133 may enter and maintain SKU information stored in the PUB database using the PUB Web GUI interface 134 and PUB Bulk Loader interface 136. The SKU information may include SKU attribute values such as, for example, UPCs, vendors, categories, category hierarchy, images, articles, descriptive information, regulation codes, etc. The PUB Web GUI interface 134 allows merchants to edit SKU information, products, and/or categories. The PUB Bulk Loader 136 supports the processing of data files from outside the PUB Subsystem into the PUB database 141. According to a specific embodiment, the PUB Bulk Loader is configured to allow merchants to upload a variety of data file types into the PUB database including flat data files, and image files. The Bulk Loader processes the flat file information to create appropriate database records for the PUB catalog.

Periodically (e.g., minutes, hours, days) the OMS polls the PUB database for new and updated SKU information, and stores the retrieved data into the OMS database 151. According to a specific embodiment, OMS maintains available-to-promise (ATP), price, and inventory (e.g., replenishment and purchasing) information for each SKU. OMS may also capture and/or manage sales and shipment data relating to each SKU. Periodically, OMS passes new and updated SKU information it acquires from the PUB Subsystem to the OFS. The SKU information may be used by OFS, for example, to maintain physical inventory and fulfill orders.

According to a specific embodiment, the PUB Subsystem 140 may be used as an interface to allow merchants/vendors to enter regulated merchandise processing instructions relating to specific SKUs. An examples of regulated merchandise processing instructions for selected regulated products is shown in FIGS. 4 and 7A–C of the drawings.

It will be appreciated that, in an alternate embodiment, the regulated merchandise processing instructions may be entered by merchants, vendors, or other human operators via the Webstore interface 132, or via other desired system interfaces. Further, according to a specific implementation, the merchant or vendor is able to add, rearrange, and remove items from the list of regulated items.

According to at least one alternate embodiment, regulated merchandise processing instructions may be generated manually or automatically using a general set of business rules and information relating to laws and regulations governing on-line sales transactions in selected states and/or regions. A preliminary list of regulated items may also be generated in the same manner to be approved or edited by merchants. In any of these embodiments, the regulated merchandise processing instructions are typically stored in a database for retrieval at an appropriate point of use.

Webstore Subsystem (WS)

According to a specific implementation, the Webstore Subsystem (WS) 132 provides an interface for enabling customers to access an on-line store (e.g. Webstore), which, for example, may be used to provide a customer with an electronic representation of a retail store. In a specific embodiment where the Webstore may be implemented as a website on the World Wide Web, customers 102 may access the Webstore via the Internet 104 or World Wide Web using any one of a plurality of conventional browsers. The Webstore user interface may be designed to provide a rich set of functions without requiring any special browser plug-ins. Thus, according to a specific embodiment, customers may access the Webstore using any client machine, regardless of the machine's operating system platform. Additionally, for security purposes, the Webstore interface also supports data encryption for exchange of any sensitive or private information between the customers and the website. According to a specific embodiment, the secure Webstore interface may be implemented using a secure http protocol (HTTPS), commonly known to those of ordinary skill in the art.

In accordance with a specific embodiment, the Webstore Subsystem 132 may be configured to support a number of customer related features such as, for example, self registration; accessing of customer account information; browsing of product categories and category hierarchy; viewing of product images and product information; keyword searches; delivery scheduling; accessing of customer order history; customizable shopping lists; on-line shopping and ordering; etc.

The Webstore Subsystem (herein referred to as the Webstore) may be implemented using at least one server which is connected to the data network. According to a specific embodiment, the Webstore may be implemented using a plurality of web servers (e.g. a load-balanced web server farm) which helps to minimize server response time and provide real-time failover and redundancy capabilities. Further, according to a specific embodiment, in order to keep the web server response time to a minimum, the Webstore may be configured such that all processing is performed on a single server, within one process. Where a plurality of Webstore servers are used, redundant processing may be performed by at least a portion of the servers so that a single Webstore server may handle all Webstore processing tasks associated with a particular on-line customer. It will be appreciated that the Webstore server boundaries may be crossed where appropriate, such as, for example, when accessing desired databases via the data network.

Order Management Subsystem (OMS)

The Order Management Subsystem (OMS) 150 manages a variety of aspects related to the integrated system architecture of system 100, including, for example, pricing, availability, inventory, vendors, financials, procurement, and data flows between various subsystems.

As shown in FIG. 1, the OMS subsystem 150 includes at least one database 151 for storing various data received from at least a portion of the other subsystems. According to a specific embodiment, the database 151 is configured to include a plurality of schemas, such as, for example, standard packaged application schemas and/or customized schemas. According to a specific implementation, the OMS database is configured as a single Oracle database running on a Sun Solaris server.

According to a specific implementation, OMS batch processing may be controlled using a process scheduler. The process scheduler is able to manage the number of concurrent processes being run and the date/time at which certain processes are to run or be executed. The process scheduler may also enable central visibility of all processes currently running. Batch processing and reporting may be accomplished using a variety of different technologies commonly known to one having ordinary skill in the art.

The Order Management Subsystem may be configured to support both asynchronous and synchronous interfaces with the other subsystems. In a specific embodiment, the OMS is configured to support an asynchronous interface with each of the other subsystems. Additionally, each OMS interface is configurable, and may be configured to support the running of batch processes as often as is desirable.

Implementation of the various interfaces between OMS and the other subsystems may be accomplished using a variety of different techniques commonly known to one having ordinary skill in the art. The following description provides an example of at least some of the various techniques which may be used for interfacing OMS with the other subsystems. However, it will be appreciated that the specific interfaces described below may be implemented using other techniques commonly known to those of ordinary skill in the art.

The interface between the OMS and the Webstore Subsystem may be implemented, for example, using a plurality of executable programs. A first portion of the executable programs may be responsible for moving data from the Webstore to the OMS. This data may include, for example, new/updated customer data, new/updated order data, order cutoff information, order billing information, customer return information, customer credits and fees (e.g. bill adjustment data), etc. A second portion of the executable programs is responsible for moving data from the OMS to the Webstore Subsystem. This data may include, for example, inventory data, availability data, pricing data, and information about shipped customer orders.

Order Fulfillment Subsystem (OFS)

The Order Fulfillment Subsystem 160 manages all functionality of the distribution center (DC). In the embodiment of FIG. 1, the OFS includes appropriate hardware and/or software for managing the DC, including, for example, a warehouse management system (e.g. application software), at least one database 161, an optional automated material handling (AMH) controller component 163, if desired (which manages conveyor, carousel, and scanner components), etc.

In a specific implementation, the Order Fulfillment Subsystem 160 may be implemented using a warehouse management system such as, for example, the MOVE warehouse management system provided by Optum, Inc. of Costa Mesa, Calif. The warehouse system also provides an interface with the Order Management Subsystem. In a specific embodiment, this interface may be implemented using a business host interface (BHI). The warehouse management subsystem may also provide the interface for allowing the OMS subsystem to communicate with the OFS database 161.

The description is only a partial description of an architecture that is suitable for practicing the current invention, with emphasis on the subsystems that are most directly involved in the Regulated SKU Processing Procedure of the present invention. For a more complete description of such an architecture, see U.S. patent application Ser. No. 09/568, 603.

It will be appreciated that other embodiments of the system of FIG. 1 may be used for implementing the technique of the present invention. For example, entire subsystems or selected features or components of the WS Subsystem 132, OMS Subsystem 150, PUB Subsystem 140, and/or OFS Subsystem 160 may be eliminated (if desired) or incorporated into other subsystems of the system of FIG. 1. Such modifications will be apparent to one having ordinary skill in the art. In a specific embodiment, it is preferable that the system 100 include at least a Webstore Subsystem (for receiving customer orders and maintaining inventory records), and an Order Fulfillment Subsystem (for fulfilling customer orders).

Figure 2:
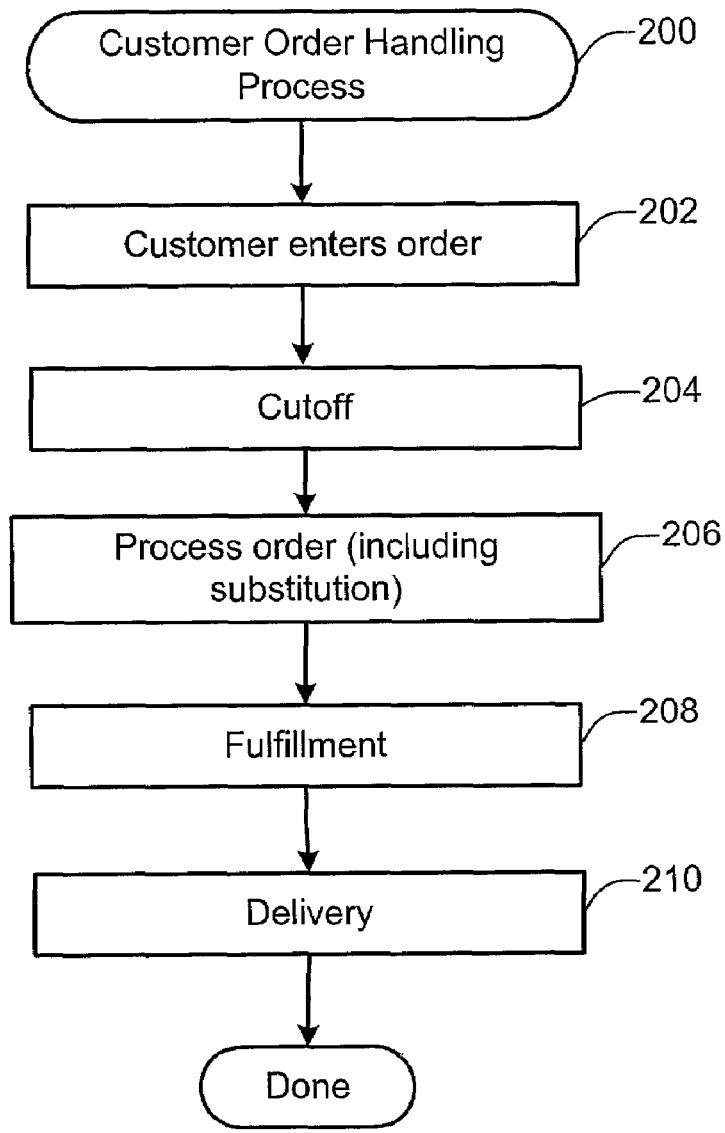
FIG. 2 shows a flow diagram of a Customer Order Handling Process in accordance with a specific embodiment of the present invention.

FIG. 2 shows a flow diagram of a Customer Order Handling Process 200 in accordance with a specific embodiment of the present invention. The Customer Order Handling Process of FIG. 2 depicts a simplified overview of the various processes by which customer orders are taken, the customer orders are processed, and the customer orders are fulfilled and delivered in accordance with a specific embodiment of the present invention.

At 202, a customer enters his or her customer order via the Webstore 132 interface (described above). According to a specific embodiment, a "customer order" includes a list of SKU items that have been ordered, their associated quantities, and other relevant information (e.g., payment information, delivery time information, etc.)

The customer order may include one or more "line item orders," where each line item order corresponds to a particular SKU and includes a desired quantity of the ordered SKU.

According to a specific embodiment, during the customer ordering process, customers will be provided information relating to availability of items. For example, customers may be provided with information relating to particular items which will not be available for delivery at the delivery window selected by the customer.

Returning to FIG. 2, at a designated time after a customer order has been placed, a "cutoff" time occurs (204), at which point the customer is no longer able to modify the order. The customer order is then sent along with other "cutoff" customer orders to be processed (206). The processing of a customer order is generally described in U.S. patent application Ser. No. 09/568,603, previously incorporated herein by reference. In one implementation, order processing may be implemented at the Webstore Subsystem 132. In alternate embodiments, the order processing may be implemented at any desired subsystem which has been configured to handle the various tasks associated with the processing of customer orders. After the customer order has been processed, the customer order is then fulfilled (208) by obtaining the appropriate items from a warehouse, distribution center, or other locations. Once the order has been fulfilled, it may then be delivered (210) to the customer.

According to different embodiments of the present invention, there are a variety of techniques which may be used to help prevent the sale of restricted products to on-line customers which would violate legal regulations in various jurisdictions. For example, one technique for preventing illegal sales of restricted products is to prevent the restricted products from being displayed to the customers during the on-line customer shopping session. Another technique is to not allow the regulated item to be added to the customer's electronic shopping cart. A further example is to not permit the regulated item to be checked out of the customer's electronic shopping cart. Yet another example is to prevent delivery of the regulated item to the customer. Several of these examples are described in greater detail below with respect to FIGS. 3A, 3B, 5, and 6 of the drawings.

Figure 3A:
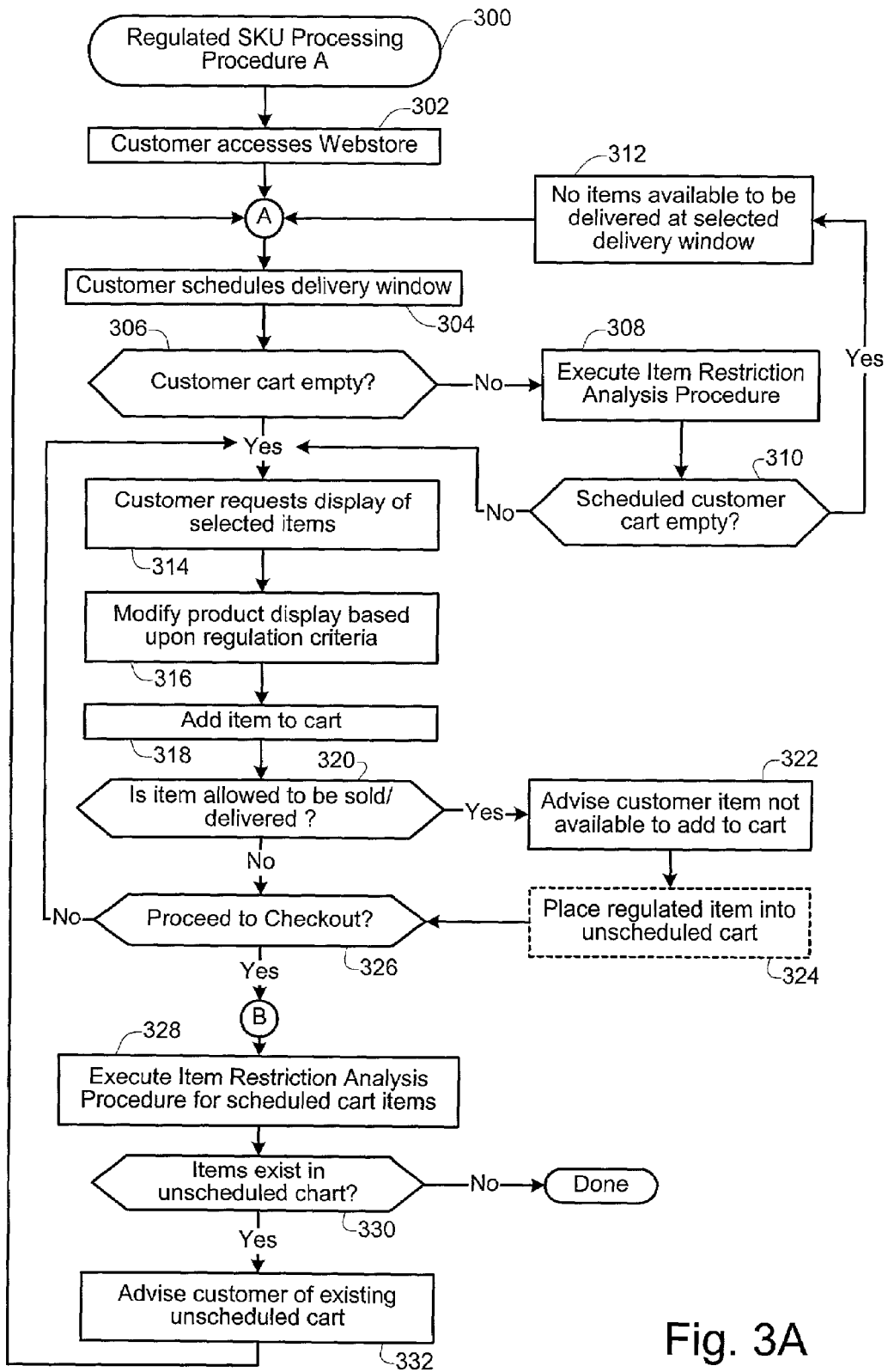
FIG. 3A shows a flow diagram of a Regulated SKU Processing Procedure A in accordance with a specific embodiment of the present invention.

FIG. 3A shows a flow diagram of a Regulated SKU Processing Procedure A (300) in accordance with a specific embodiment of the present invention. According to one implementation, the Regulated SKU Processing Procedure 300 may be implemented during an on-line customer shopping session. Additionally, according to a specific implementation, the Regulated SKU Processing Procedure 300 may be implemented at the web store 130 of FIG. 1.

Initially, as shown at 302 of FIG. 3A, a customer may access the on-line merchant's electronic commerce system in order to initiate a shopping session. According to a specific implementation, as shown in FIG. 1, for example, the customer may access the Webstore 130 for initiating an on-line shopping session.

Once the customer has initiated a shopping session with the on-line merchant's electronic commerce system, the customer may begin to shop by browsing the on-line merchant's catalog and adding items to the customer's electronic shopping cart. According to a specific implementation, the customer may schedule (304) a specific delivery window (e.g. specifying a particular date and time) for receiving delivery of the customer order. For example, the on-line merchant Webvan.com requires that customers select a delivery window for each customer order that is placed with the on-line system. Once the customer order has been fulfilled, it will subsequently be delivered to the customer at the time and date specified by the selected delivery window. At the time of delivery, the customer may be asked to provide a signature for proof of receipt of the customer order. According to some jurisdictions, the sale of a product is considered to occur at the time that the product is actually delivered to the customer. Accordingly, it will be appreciated that, according to specific embodiments, the delivery window may determine whether the sale of a particular restricted product is permitted.

According to a specific embodiment, each customer delivery address may be geocoded or mapped to a respective area, zone, and/or subzone, which, according to a specific implementation, are not based upon the zip code of the delivery address. This mapping technique is advantageous since municipal regulations frequently define regulated regions of commerce by area, zone, or subzone (e.g. "dry zones" where the sale of alcohol is prohibited). Moreover, such regulated regions may bisect one or more zip code regions. Accordingly, using the customer delivery address geocoding technique of the present invention, delivery zones or subzones may be defined which map directly to a municipally regulated zone or subzones. Thus, for example, if a municipally regulated "dry zone" is mandated which bisects one or more zip code regions, a delivery zone may be defined to correspond to the mandated dry zone boundaries, regardless of zip code boundaries. Regulated product(s) may then be prevented from being sold or delivered to customers whose delivery address is within this "dry" delivery zone.

Figure 3B:
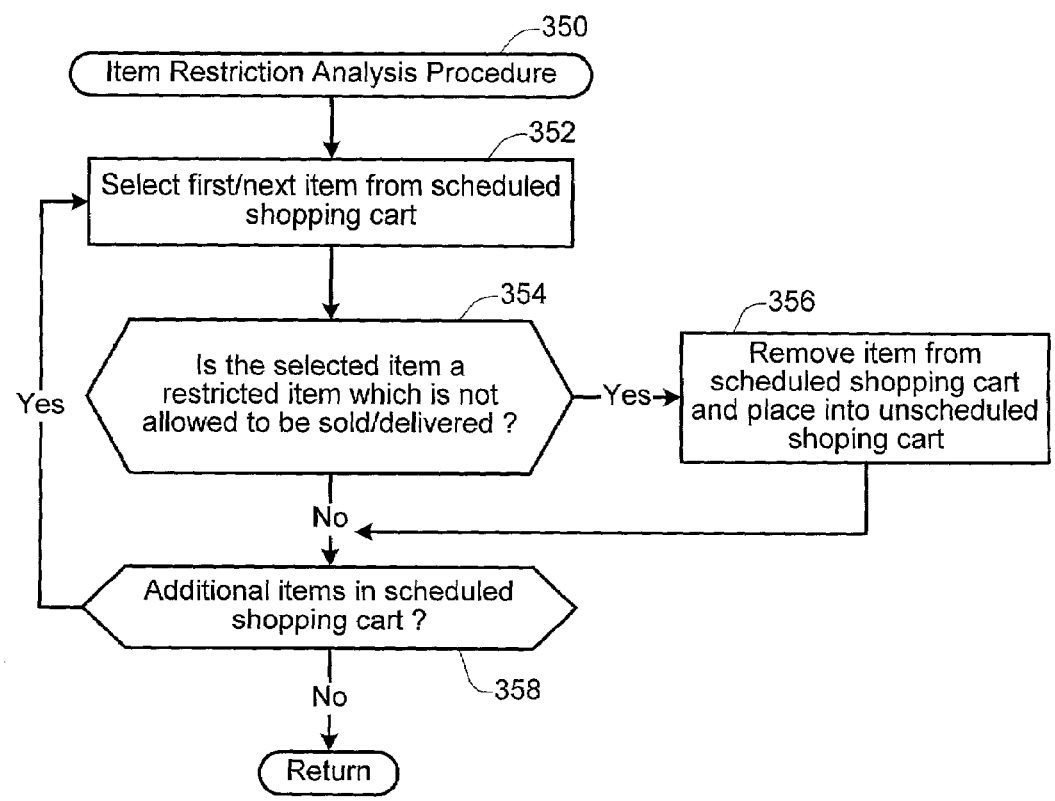
FIG. 3B is a flow diagram of an Item Restriction Analysis Procedure in accordance with a specific embodiment of the present invention.

According to a specific embodiment, after the customer selects or schedules a delivery window for delivery of the customer order, the customer's electronic shopping cart may be examined to determine (306) whether the customer's electronic shopping cart includes any items. According to a specific embodiment, if it is determined that the customer cart is not empty, an Item Restriction Analysis Procedure may be executed (308) in order to remove any regulated items selected by the customer which are not available to be delivered at the specified delivery window. An example of an Item Restriction Analysis Procedure is shown in FIG. 3B of the drawings.

During the Item Restriction Analysis Procedure, a first item from the customer's scheduled shopping cart is selected (352). The selected item is then analyzed (354) in order to determine whether the selected item corresponds to a regulated item which is not allowed to be delivered at the designated delivery window. In performing this determination, a regulation code associated with the selected item or SKU may be identified. A regulation table (e.g. Regulation Table 400) may then be consulted to determine whether the sale or delivery of the identified, regulated SKU is permissible. If it is determined that the selected item is not allowed to be sold or delivered to the customer at the designated delivery window, a selected item may be removed (356) from the customer's scheduled shopping cart and placed into an unscheduled shopping cart. If, however, it is determined that the selected item is allowed to be sold and delivered to the customer at the designated delivery window, no further action is taken regarding the selected item. Once the Item Restriction Analysis Procedure has been performed for the selected item, a determination may then be made (358) as to whether there are additional items in the customer's scheduled shopping cart. If so, a next item from the scheduled shopping cart is selected for analysis. This process may continue until each of the items in the customer's scheduled shopping cart have been analyzed by the Item Restriction Analysis Procedure.

Returning to FIG. 3A, once the Item Restriction Analysis Procedure has performed an analysis on the items in the customer's scheduled shopping cart, a determination may then be made (310) as to whether the customer's scheduled shopping cart is empty. If so, the customer may be advised (312) that no items are available to be delivered at the selected delivery window. According to a specific implementation, the customer may then be provided with the opportunity to select an alternate delivery window.

According to an alternate embodiment, the customer may not be required to select a delivery window. For example, many on-line merchants such as, for example, Amazon.com, do not require the customer to select a delivery window for receipt of the customer order. Rather, the on-line merchant allows the customer to purchase products via the Internet. The purchased items are then packaged and shipped to the customer via common carrier. Typically, the customer is charged for the purchase of the goods at the time that the order is shipped to the customer.

One technique for handling on-line sales of regulated products is to dynamically modify the display of products which are available to be sold/delivered to each customer. This is shown, for example, at events 314 and 316 of FIG. 3A.

During the customer's on-line shopping session, the customer may request (314) display of selected items available for purchase by the on-line merchant. According to a specific implementation, the display of items available for purchase by the customer may be modified (316) based upon predetermined rules such as, for example, the regulation criteria defined in one or more regulation lists. The modification of the product display may be based upon a number of different factors such as, for example, the customer's delivery address, the customer's age, the customer's residence address, the date/time of delivery (if any), etc. According to one embodiment, the products which are not allowed to be sold or delivered to a specific customer may be hidden or otherwise prevented from being displayed to that customer. Alternatively, the regulated items may be displayed to the customer, but the customer will not be allowed to add the regulated item to the customer's electronic shopping cart.

Another technique for handling on-line sales of regulated items is to screen for regulated items as the customer selects each item to add to his or her electronic shopping cart. This is generally shown by events, for example, 318–326 of FIG. 3A.

Initially, the customer may select a particular item, and submit a request to add (318) the selected item to the customer's shopping cart. An analysis may then be conducted (320) in order to determine whether the selected item is allowed to be sold and delivered to the customer (at a specified delivery window, if any). In performing this determination, a regulation code associated with the selected item or SKU may be identified. A regulation table (e.g. Regulation Table 400) may then be consulted to determine whether the sale or delivery of the identified, regulated SKU is permissible.

If it is determined that the selected item is not allowed to be sold and delivered to the customer, the customer may be advised (322) that the selected item is not available to be added to the customer's electronic shopping cart. Additionally, according to a specific implementation, the regulated item may be placed (324) into an unscheduled shopping cart for the customer. If, on the other hand, it is determined that the selected item is allowed to be sold and delivered to the customer, the selected item may then be added to the customer's electronic shopping cart. Thereafter, the customer may continue with his or her on-line shopping session or may request to proceed to checkout.

According to a specific embodiment, another approach for handling on-line sales of regulated products is to screen the customer's electronic shopping cart for regulated items during checkout. This technique is generally described, for example, by events 326–332 of FIG. 3A.

Referring to FIG. 3A, at some point during the on-line shopping session, the customer may request to proceed to checkout in order to purchase the goods in the customer's electronic shopping cart. If, according to one embodiment, precautions have already been implemented for preventing inappropriate regulated items from being placed into the customer's scheduled shopping cart, then the checkout operation may proceed normally, whereby items in the customer's scheduled shopping cart may be check out (328) for purchase by the customer. If, according to a specific embodiment, selected regulated items have previously been placed into an unscheduled shopping cart for the customer, a determination may then be made (330) as to whether any items exist in the customer's unscheduled shopping cart. If so, the customer may be advised (332) of the existence of the unscheduled shopping cart. Thereafter, the customer may then choose to continue shopping using the customer's unscheduled shopping cart.

Figure 5:
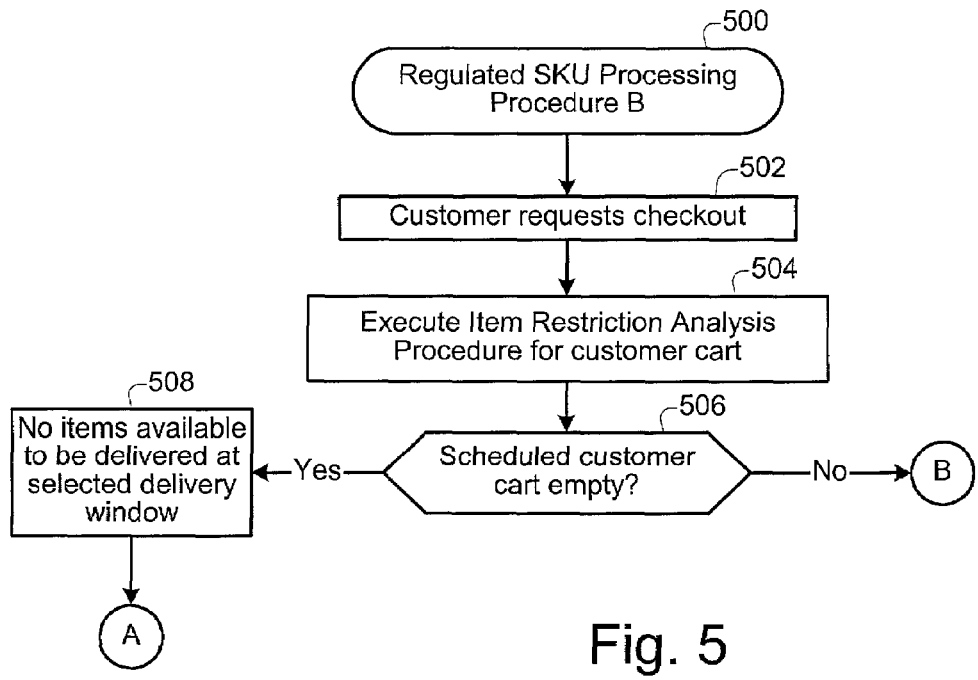
FIGS. 5 and 6 show alternate embodiments of the Regulated SKU Processing Procedure.
Figure 6:
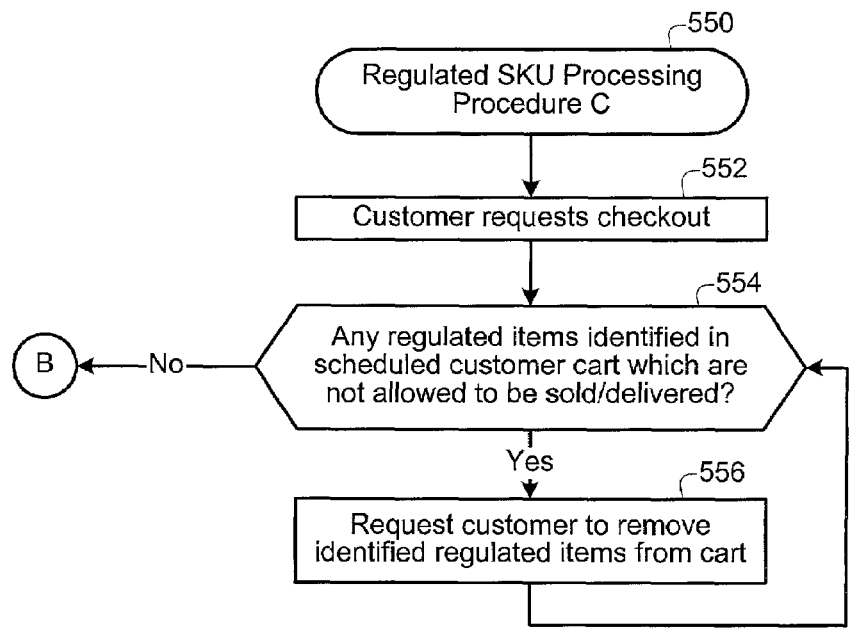

Alternate embodiments of the Regulated SKU Processing Procedure are shown in FIGS. 5 and 6 of the drawings. In each of these embodiments, on-line sales of regulated SKU items may be handled during the customer checkout operation, where upon the content of the customer's shopping cart may be screened for regulated items which are not allowed to be sold/delivered to the customer.

As shown in the embodiment of FIG. 5, once the customer has requested (502) checkout, an Item Restriction Analysis Procedure may be executed (504) for analyzing the contents of the customer's shopping cart. An example of an Item Restriction Analysis Procedure is shown in FIG. 3B, described previously. In the example of FIG. 3B, the Item Restriction Analysis Procedure will remove regulated items from the customer's current shopping cart which are not allowed to be sold or delivered to the customer, and may place the removed items into a new shopping cart. At 506 a determination is made as to whether there are any remaining items to be checked out of the customer's current shopping cart after having executed the Item Restriction Analysis Procedure. If so, flow may then commence starting at point B of FIG. 3A. If, however, it is determined that there are no current items to be checked out from the customer's shopping cart, the customer may be advised (508) that there are no items available to be delivered or sold to the customer. The customer may also be advised as to the reason why the regulated items are unavailable. Thereafter, flow may then continue at point A of FIG. 3A.

As shown in the embodiment of FIG. 6, once the customer has requested (552) checkout, a determination is then made (554) as to whether there are any regulated items identified in the customer's shopping cart which are not allowed to be sold or delivered to the customer, based upon predetermined criteria such as that shown, for example, in FIG. 4. If so, the customer may be requested (556) to remove the identified regulated items from the customer's electronic shopping cart. After all of the identified regulated items have been removed from the customer's electronic shopping cart, flow may then continue at point B of FIG. 3A.

Another technique for preventing illegal sales of restricted products is to prevent delivery of the regulated item to the customer. According to a specific embodiment, delivery couriers (110, FIG. 1) may be notified that a particular shipment contains one or more regulated items. A delivery courier may then be required to verify specific information (e.g. proof of age of the customer) before delivering the regulated item(s) to the customer. According to a specific implementation, the delivery restrictions may be provided to the delivery courier via the use of a mobile field device (MFD) 106. A mobile field device (MFD) may be configured to download and/or upload various types of information, including, for example, customer order history information, delivery information (e.g. vehicle delivery routes, stops, etc.), customer returns information, credits, adjustments, regulated delivery information, etc.

Other Embodiments

Generally, the regulated item processing techniques of the present invention may be implemented on software and/or hardware. For example, they can be implemented in a separate user process, in a library package bound into network applications, on a specially constructed machine, etc. In a specific embodiment of this invention, the technique of the present invention is implemented in software such as an application running on an operating system.

A software or software/hardware hybrid implementation of the regulated item processing technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. A general architecture for some of these machines will appear from the description given below. In an alternative embodiment, the regulated item processing technique of this invention may be implemented on a general-purpose network host machine such as a personal computer or workstation. Further, the invention may be at least partially implemented on a card (e.g., an interface card) for a network device or a general-purpose computing device.

Figure 8:
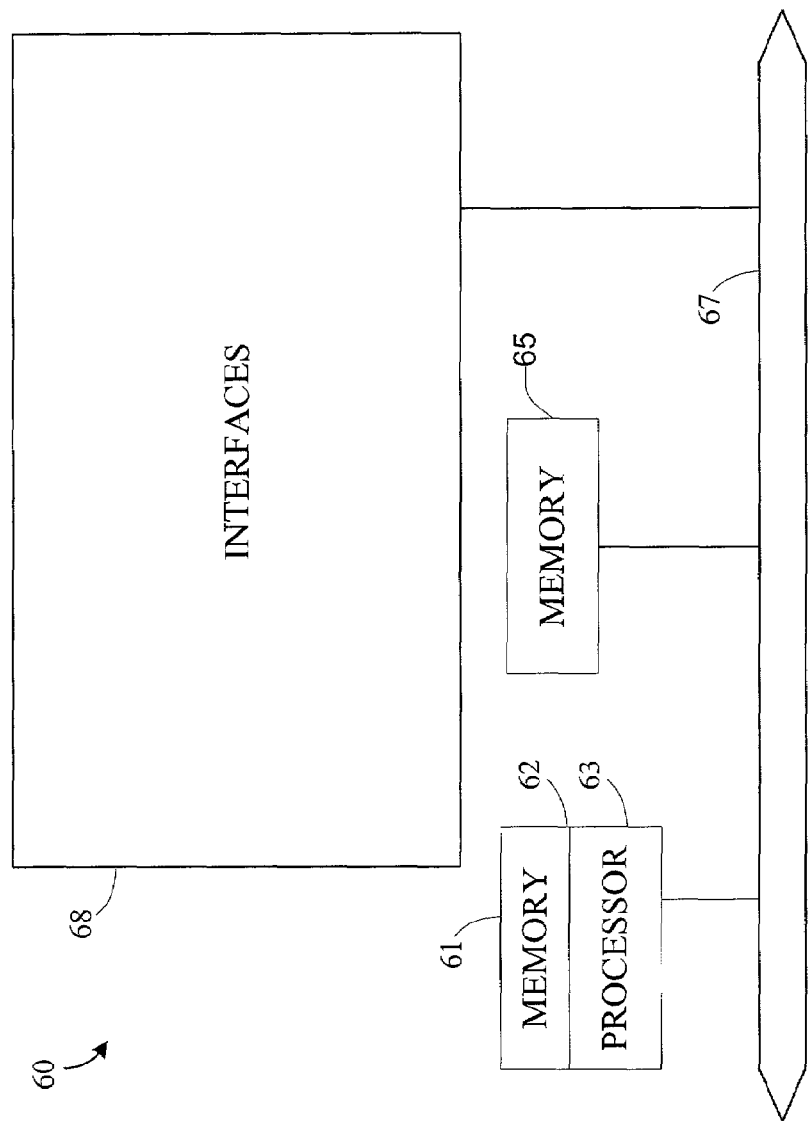
FIG. 8 shows a specific embodiment of a network device suitable for implementing the regulated item processing techniques of the present invention.

Referring now to FIG. 8, a network device 60 suitable for implementing the regulated item processing techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured to perform the functions of a server system adapted to implement electronic commerce transactions, the CPU 62 may be responsible for analyzing packets, encapsulating packets, forwarding packets to appropriate network devices, identifying regulated items or SKUs, identifying legal requirements or conditions which require compliance action to be taken with regard to the sale of regulated products, determining appropriate compliance actions to be implemented for identified regulated items, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the regulated item processing techniques described herein. The program instructions may control the operation of an operating system and/or one or more applications, for example. The memory or memories may also be configured to include data structures which store regulation code information, Condition ID information, Restriction ID information, regulation information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claim:

1. A system for implementing electronic commerce transactions via a data network, the system comprising:
   at least one CPU;
   memory; and
   at least one interface configured to provide an interface with at least one customer via the data network;
   the system configured to identify a regulated item selected by a customer, the regulated item corresponding to an item which satisfies one or more predetermined criteria, the one or more predetermined criteria indicating that the item is subject to one or more regulations;
   the system configured to take action to prohibit purchase, via the data network, of the regulated item by the customer;
   the regulated item being part of an on-line order from the customer with the on-line merchant, the on-line order also having information from the customer regarding a delivery time for the order;
   the system configured to modify a display of items available for purchase by the customer, wherein the display modification includes restricting display of items which are restricted by the one or more regulations from being purchased by the customer based upon the one or more predetermined criteria; and
   the system is further configured to remove the regulated item from an electronic shopping cart associated with the customer in response to a determination that the regulated item is not allowed to be purchased by the customer based upon the one or more predetermined criteria.

2. The system of claim 1 wherein said system further configured to implement on-line sales of products to the customer.

3. The system of claim 1 wherein the one or more predetermined criteria correspond to one or more regulations which restrict sales of the regulated item to persons in a particular jurisdiction.

4. The system of claim 3 wherein the one or more regulations restrict sales of the regulated item during specific time periods.

5. The system of claim 3 wherein the one or more regulations restrict sales of the regulated item during specific days.

6. The system of claim 3 wherein the regulated item corresponds to a class of regulated products selected from the group consisting of: alcohol products, tobacco products, and dairy products.

7. The system of claim 1 wherein the one or more predetermined criteria correspond to regulations which prohibit delivery of the regulated item to persons in a particular jurisdiction.

8. The system of claim 1 wherein the one or more predetermined criteria correspond to regulations which restrict sales of the regulated item to persons under a minimum age.

9. The system of claim 1 wherein the processor is configured to store into the memory the one or more predetermined criteria, the one or more predetermined criteria including at least one regulation code parameter for use in identifying items which are associated with a class of regulated products; and
   wherein the system is configured to associate a specific regulation code parameter with the regulated item.

10. The system of claim 1 wherein the processor is configured to store into the memory the one or more predetermined criteria, the one or more predetermined criteria including at least one condition parameter for use in identifying selected legal requirements which necessitate an invocation of at least one type of compliance action in order to comply with the selected legal requirements.

11. The system of claim 1 wherein the processor is configured to store into the memory the one or more predetermined criteria, the one or more predetermined criteria including at least one restriction parameter for use in identifying at least one type of compliance action to be performed in order to comply with legal regulations which restrict sales of the regulated item to persons in a particular jurisdiction.

12. The system of claim 1 further comprising:
an inventory subsystem comprising memory, said inventory subsystem including an inventory database configured to maintain inventory records of a plurality of items of merchandise;
a customer interface subsystem in communication with the inventory subsystem, said customer interface subsystem configured to store available inventory data from said inventory subsystem, and further configured to present selected item information relating to said inventory merchandise to at least one customer, said customer interface subsystem being further configured to facilitate customer shopping transactions, and to store customer order information; and
an order fulfillment subsystem in communication with said inventory subsystem, said order fulfillment subsystem being configured to receive said customer order information, said order information including at least one customer order for at least one item, said order fulfillment subsystem further configured to facilitate fulfillment of said customer order, wherein fulfillment of a customer order includes obtaining at least a portion of items relating to the order, and preparing the obtained items for shipment to the customer.

13. The system of claim 12 further comprising a delivery subsystem in communication with said customer interface subsystem and said inventory subsystem, said delivery subsystem being configured to receive items relating to at least one fulfilled customer order, said delivery subsystem further configured to facilitate delivery of said received items to said at least one customer.

14. A computer-implemented method for implementing electronic commerce transactions via a data network, the method comprising:
identifying a regulated item selected by a customer, the regulated item corresponding to an item which satisfies one or more predetermined criteria, the one or more predetermined criteria indicating at least that the item is subject to one or more regulations; and
taking action to prevent the purchase of the regulated item via the data network by the customer;
wherein said taking action is automatically implemented at a server system configured to implement electronic commerce transactions between an on-line merchant and the customer, the regulated item being part of an on-line order from the customer with the on-line merchant, the on-line order also having information from the customer regarding a delivery time for the order; and
wherein said taking action comprises taking action to remove the regulated item from an electronic shopping cart associated with the customer, the removal of the regulated item from the electronic shopping cart being based on the one or more predetermined criteria and the delivery time.

15. The method of claim 14, wherein the delivery time is associated with a day of week, and wherein the one or more regulations at least restrict the sale of the at least one regulated item on at least one day of the week.

16. The method of claim 14, wherein the at least one restriction requires an appropriate recipient to be present to receive the delivery.

17. The method of claim 14, wherein the one or more regulations depend on a location associated with the customer.

18. The method of claim 17, wherein the one or more regulations are acquired from a data store associated with a server system that performs said method, and wherein the data store stores a plurality of regulation limitations for a plurality of different locations.

19. The method of claim 14, wherein the one or more regulations prohibit delivery of the at least one regulated item at the delivery time, and wherein the customer can choose another delivery time or can subsequently remove the at least one regulated item from the online order and continue with the delivery time.

20. The method of claim 14 wherein the one or more predetermined criteria correspond to one or more regulations which restrict sales of the regulated item to persons in a particular jurisdiction.

21. The method of claim 20 wherein the one OT more regulations restrict sales of the regulated item during specific time periods.

22. The method of claim 20 wherein the one or more regulations restrict sales of the regulated item during at least one specific day.

23. The method of claim 20 wherein the regulated item corresponds to a class of regulated products selected from the group consisting of: alcohol products, tobacco products, and dairy products.

24. The method of claim 14 wherein the one or more predetermined criteria correspond to one or more regulations which prohibit delivery of the regulated item to persons in a particular jurisdiction.

25. The method of claim 14 wherein the one or more predetermined criteria correspond to one or more regulations which restrict sales of the regulated item to persons under a minimum age.

26. A system for implementing electronic commerce transactions via a data network, the system comprising:
at least one CPU,
memory; and
at least one interface configured to provide an interface with at least one customer via the data network;
the system being configured to identify a regulated item selected by a customer, the regulated item corresponding to an item which satisfies one or more predetermined criteria, the one or more predetermined criteria indicating that the item is subject to one or more regulations;
the system configured to take action to prohibit purchase, via the data network, of the regulated item by the customer;
the regulated item being part of an on-line order from the customer with an on-line merchant, the on-line order also having information from the customer regarding a delivery time for the order; and
the system is further configured to remove the regulated item from an electronic shopping cart associated with the customer in response to a determination that the regulated item is not allowed to be purchased by the customer based upon the one or more predetermined criteria.

27. The system of claim 26 wherein said system further configured to implement on-line sales of products to the customer.

28. The system of claim 26 wherein the one or more predetermined criteria correspond to one or more regulations which restrict sales of the regulated item to persons in a particular jurisdiction.

29. The system of clam 28 wherein the one or more regulations restrict sales of the regulated item during specific time periods.

30. The system of claim 28 wherein the one or more regulations restrict sales of the regulated item during specific days.

31. The system of claim 28 wherein the regulated item corresponds to a class of regulated products selected from the group consisting of: alcohol products, tobacco products, and dairy products.

32. The system of claim 26 wherein the one or more predetermined criteria correspond to regulations which prohibit delivery of the regulated item to persons in a particular jurisdiction.

33. The system of claim 26 wherein the one or more predetermined criteria correspond to regulations which restrict sales of the regulated item to persons under a minimum age.

34. The system of claim 26 wherein the system being further configured to modify a display of items available for purchase by the customer, wherein the display modification includes visually indicating those items which are restricted by the one or more regulations from being purchased by the customer based upon the one or more predetermined criteria.

35. The system of claim 26 wherein the processor is configured to store into the memory the one or more predetermined criteria, the one or more predetermined criteria including at least one regulation code parameter for use in identifying items which are associated with a class of regulated products; and wherein the system is configured to associate a specific regulation code parameter with the regulated item.

36. The system of claim 26 wherein the processor is configured to store into the memory the one or more predetermined criteria, the one or more predetermined criteria including at least one condition parameter for use in identifying selected legal requirements which necessitate an invocation of at least one type of compliance action in order to comply with the selected legal requirements.

37. The system of claim 26 wherein the processor is configured to store into the memory the one or more predetermined criteria, the one or more predetermined criteria including at least one restriction parameter for use in identifying at least one type of compliance action to be performed in order to comply with legal regulations which restrict sales of the regulated item to persons in a particular jurisdiction.

38. The system of claim 26 further comprising:

an inventory subsystem comprising memory, said inventory subsystem including an inventory database configured to maintain inventory records of a plurality of items of merchandise;

a customer interface subsystem in communication with the inventory subsystem, said customer interface subsystem configured or store available inventory data from said inventory subsystem, and further configured to present selected item information relating to said inventory merchandise to at least one customer, said customer interface subsystem being further configured to facilitate customer shopping transactions, and to store customer order information; and an order fulfillment subsystem in communication with said inventory subsystem, said order fulfillment subsystem being configured to receive said customer order information, said order information including at least one customer order for at least one item, said order fulfillment subsystem further configured to facilitate fulfillment of said customer order, wherein fulfillment of a customer order includes obtaining at least a portion of items relating to the order, and preparing the obtained items for shipment to the customer.

39. The system of claim 38 further comprising a delivery subsystem in communication with said customer interface subsystem and said inventory subsystem, said delivery subsystem configured to receive items relating to at least one fulfilled customer order, said delivery subsystem further being configured to facilitate delivery of said received items to said at least one customer.

\* \* \* \* \*

UNITED STATES PATENT AND TRADEMARK OFFICE
CERTIFICATE OF CORRECTION

| | | |
|---|---|---|
| PATENT NO. | : 7,308,423 B1 | Page 1 of 1 |
| APPLICATION NO. | : 09/813235 | |
| DATED | : December 11, 2007 | |
| INVENTOR(S) | : Woodward et al. | |

It is certified that error appears in the above-identified patent and that said Letters Patent is hereby corrected as shown below:

Column 18, line 2, "with the" should be --with an--

Column 20, line 14, "OT" should be --or--

Column 22, line 13, "configured or" should be --configured to--

Signed and Sealed this

Thirtieth Day of June, 2009

JOHN DOLL
*Acting Director of the United States Patent and Trademark Office*